H. GEBHART.
FARE BOX.
APPLICATION FILED JULY 27, 1912.

1,173,258.

Patented Feb. 29, 1916.
10 SHEETS—SHEET 1.

Fig. 1

Witnesses
W. D. Bettis
F. H. Fassett.

Inventor
Harry Gebhart
By Kerr, Page, Cooper & Hayward
Attorneys

H. GEBHART.
FARE BOX.
APPLICATION FILED JULY 27, 1912.

1,173,258.

Patented Feb. 29, 1916.
10 SHEETS—SHEET 2.

Fig. 2

Witnesses
W. D. Bettis
F. H. Fassett

Inventor
By Henry Gebhart
Kerr, Page, Cooper & Hayward
Attorneys

H. GEBHART.
FARE BOX.
APPLICATION FILED JULY 27, 1912.

1,173,258. Patented Feb. 29, 1916.
10 SHEETS—SHEET 8.

Witnesses
W. D. Bettis
F. H. Fassett

Inventor
Henry Gebhart
By Kerr, Page, Cooper & Hayward
Attorneys

THE COLUMBIA PLANOGRAPH CO., WASHINGTON, D. C.

H. GEBHART.
FARE BOX.
APPLICATION FILED JULY 27, 1912.

1,173,258.

Patented Feb. 29, 1916.
10 SHEETS—SHEET 9.

Witnesses
W. D. Kettie
F. H. Fassett

Inventor
Henry Gebhart
By Kerr, Page, Cooper & Hayward
Attorneys

UNITED STATES PATENT OFFICE.

HENRY GEBHART, OF DAYTON, OHIO.

FARE-BOX.

1,173,258.      Specification of Letters Patent.      Patented Feb. 29, 1916.

Application filed July 27, 1912. Serial No. 711,807.

*To all whom it may concern:*

Be it known that I, HENRY GEBHART, a citizen of the United States, residing at Dayton, in the county of Montgomery and State of Ohio, have invented certain new and useful Improvements in Fare-Boxes, of which the following is a full, clear, and exact description.

My invention has four principal objects: to facilitate the work of the spotter in determing whether or not the conductor accounts for every passenger who boards his car; to render the fares inaccessible to the person who removes them from the fare box; to cancel all tickets as they pass into the fare box; to furnish a printed statement showing the number of full fare passengers, half fare passengers, the total of passengers, the number of the fare box, and the direction of the car.

Other objects and advantages will be referred to later.

In the accompanying drawings

Similar numerals refer to similar parts throughout the several views.

Referring to the drawings 25 is a base and 26 the casing which incloses the mechanism and other parts of my fare box. At the top of the casing a display chamber 27 is formed. This may be of any suitable construction, have any desired form of aperture for the reception of fares, and be provided with such baffles as may be desired. All of the foregoing being well known and, as they form no part of my present invention, it is not necessary to describe them in detail.

Figure 1:
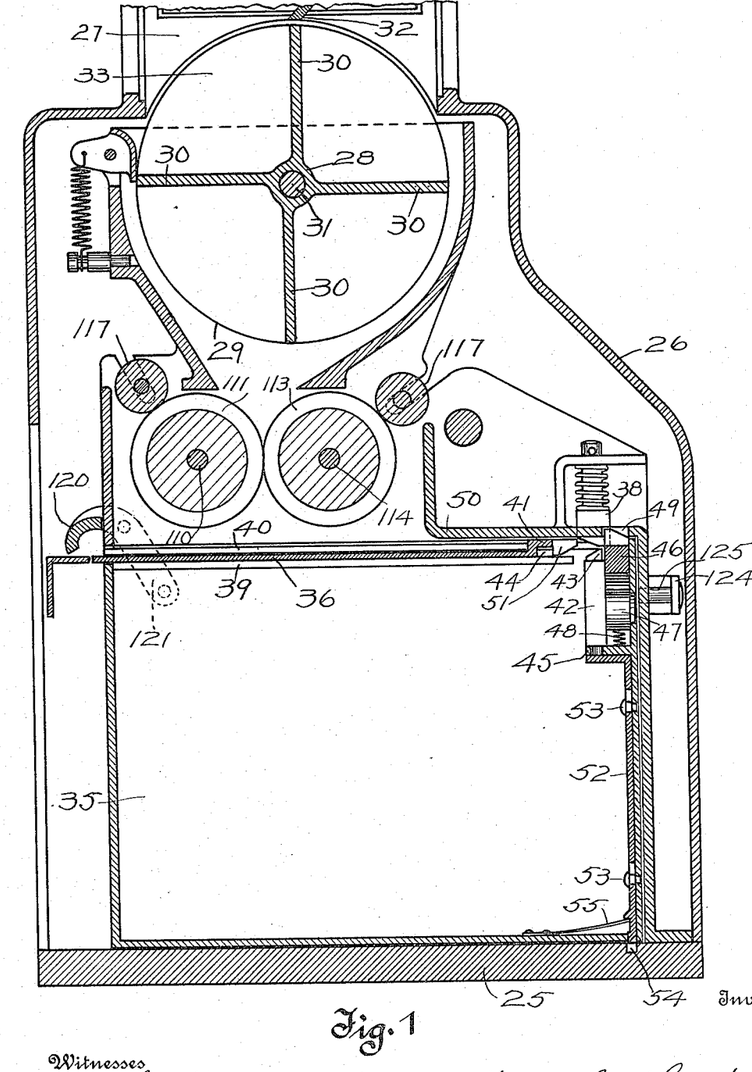
Figure 1 is a sectional elevation on line 1—1 of Fig. 2.

Obviously, as the name display chamber suggests, a portion or portions of the inclosure should be glass. Referring to Fig. 1 in particular, 28 is a turn stile comprising a pair of disks 29 united by radiating plates 30, of which there are four. The turn stile is mounted on a rotatable shaft 31. The upwardly extending plate 30 registers with the lower edge of the baffle 32 which serves to direct the fares to the space 33, at the bottom of which they are received by the horizontal plate 30, where they can be inspected by the conductor before being dropped into the canceling device below. The canceling device consists of a pair of horizontal rollers mounted to rotate with their peripheries in contact. Each of the rollers has a succession of deep annular grooves, the grooves in one roller being opposite those in the other. The annular ribs thereby formed are provided with printing devices which will print tickets as they pass between the rollers, each of the ribs acting as a platen for the printing devices on the opposing rib. Having passed through the canceling device the fare is dropped into the till 35 (see Fig. 1). The till 35 is lodged in a compartment provided for its reception and though in Fig. 1 it is shown with the lid 36 in place it is to be understood that when the fare box is in operation the lid will not be on the till.

Figure 12:
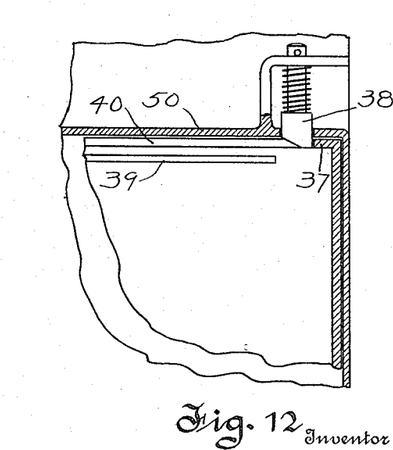
Fig. 12 is a detail of the till and fare compartment.

Referring to Fig. 12 the upper portion of the till is seen to have a flange 37 which, when the till is in the fare compartment, is engaged by a locking bolt 38, of which there are in fact two. The till cannot be removed from the compartment until the lid is put on.

Referring to Fig. 1 it will be seen that the casing 26 has an opening through which the lid may be introduced and inserted between the guides 39 and 40. The forward edge of the lid is provided with a raised portion 41 which engages the bolts 38 and lifts them clear of the flange 37 thereby eliminating the bolts 38 as obstacles to the removal of the till. The till has a spring lock 42 whose bolt 43 engages in a groove 44 in the lid thereby preventing the lid being removed. The key hole of the lock is at the rear of the till; therefore the lid cannot be removed from the till while it remains in the compartment. The lock 42 is supported on a plate 45 projecting from the rear wall of the till; it is placed a sufficient distance from said wall to allow space for a bolt 46 which, being bifurcated, straddles the cylinder 47 of the lock. Compression springs 48 tend to thrust the bolt 46 upward. When the till is placed in the compartment the upper end of the bolt 46 engages in a recess 49 in the top plate 50 of the compartment and is another element preventing withdrawal of the till.

Figure 2:
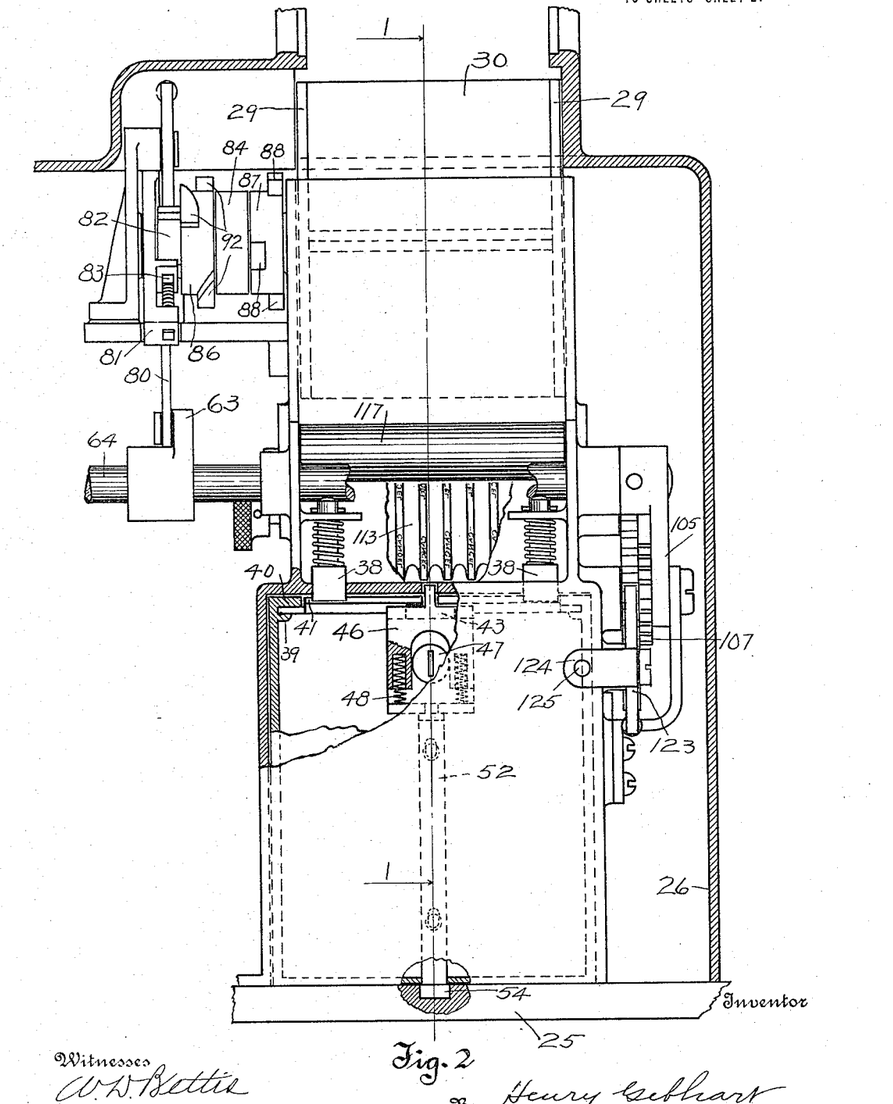
Fig. 2 is a front elevation of the portion of the machine containing the till, with the front of the casing removed and partially in section.

Referring to Fig. 2 it will be seen that the portion of the bolt 46 which enters the recess 49 is quite narrow; very much narrower than the bolt 43. The lower edge of the forward end of the till cover is beveled and a longitudinal slot 51 is formed in the end of the cover which straddles the upper end of the bolt 46. When the cover is pushed in place the beveled lower edge engages the broad portion of the bolt 46 and cams it downward thereby withdrawing its end from the recess 49. Before this happens, however, the bolt 43 of the lock will have been cammed downward by the bevel edge of the lid. When this occurs the lower end of the bolt 43, which protrudes from the lock and passes through the plate 45, will have pushed the plunger 52, secured to the rear wall of the till by suitable guide pins 53, downward and into the recess 54 in the base 25. Therefore, though the bolts 38 are lifted clear of the flange 37 and the bolt 46 is withdrawn from the recess 49 the till cannot be withdrawn until the plunger 52 is withdrawn from the recess 54, which occurs when the bolt 43 falls into the recess 44. The spring 55 then lifts the plunger 52 out of the recess 54, thereby releasing the till from all restraint. It is obvious, from the foregoing, that the release of the till is conditional upon the lid being locked. Therefore, the person who removes the till from the register has no opportunity whatever to remove the contents from the till unless he has a key to the lock 42.

The fare box is mounted upon a suitable pedestal at the entrance of the car and is operated by two foot pedals (not shown), each of which is connected to one of the pull rods, 60 and 61. The rod 60 is attached to a lever 62 by a slot and pin connection, while the rod 61 is attached to the lever 63 by a similar connection; levers 62 and 63 are rigidly attached to a rock shaft 64 which is journaled in the frame work of the machine. A lever 65 rigidly attached to the rock shaft is operatively connected to a counter 66 by a link 67. Levers 68 and 69 loosely mounted on the rock shaft are connected respectively to counters 70 and 71 by links 72 and 73. A detailed description of the counters is not necessary as their construction forms no part of my present invention, it being sufficient to say that any one of several well known forms of counters will answer the purpose, provided the numerals are adapted to print. The levers 68 and 69 carry rollers 74 which lie against cam faces 75 on rods 60 and 61. When one of the rods is pulled downward it carries with it the lever to which it is attached, thereby rocking the shaft 64, while its cam face 75 rocks the counter lever it is associated with. Springs 77 return and hold the counter levers in their normal position. They also, through their contact with the cam faces 75, sustain the pull rods. Spring 78 returns the shaft 64 to normal position. When a rod is moved the pin by which the other rod is connected to its lever moves idly in the slot and does not move the other rod, the slots being arcual. It is therefore seen that the counter 66 registers one each time either pedal is operated, while the counter 70 counts only when the rod 60 is operated and the counter 71 registers when the rod 61 is operated. The counter 70 is used to register half fares and the counter 71 to register full fares. Obviously, the counter 66 registers the total fares.

Figures 5, 6:
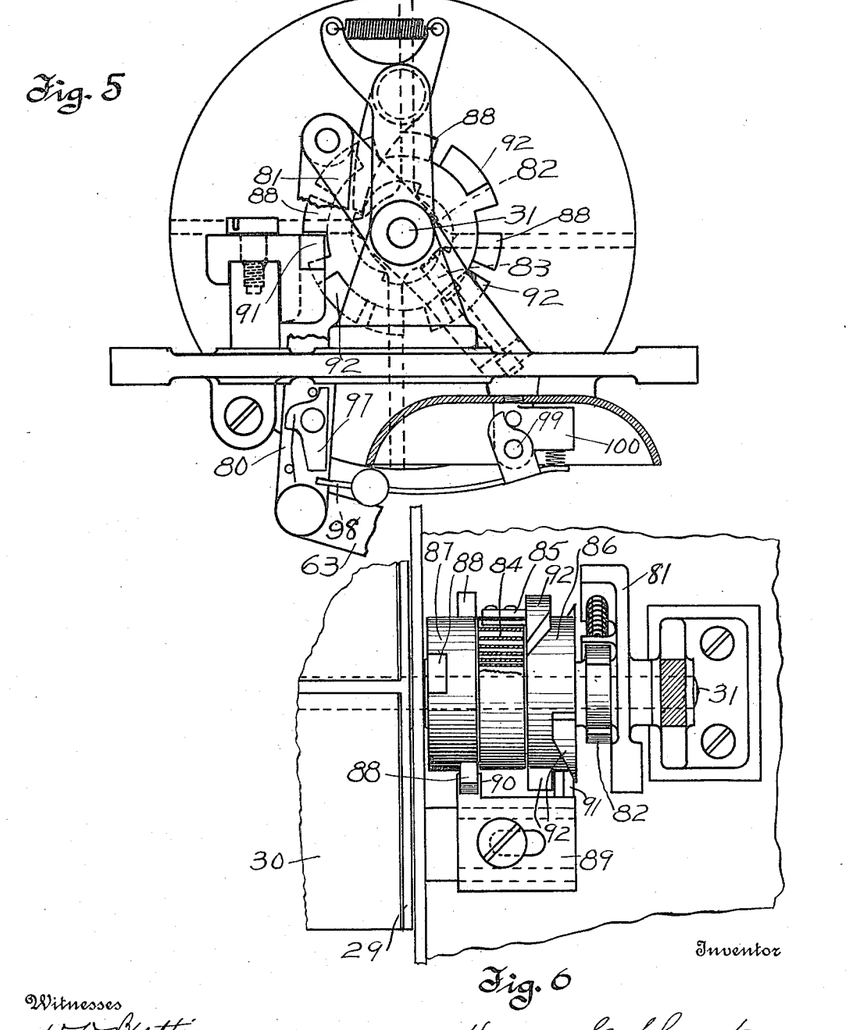
Fig. 5 is an end elevation of the mechanism for dropping fares from the displayer.
Fig. 6 is a plan of the mechanism shown in Fig. 5.
Figure 7:
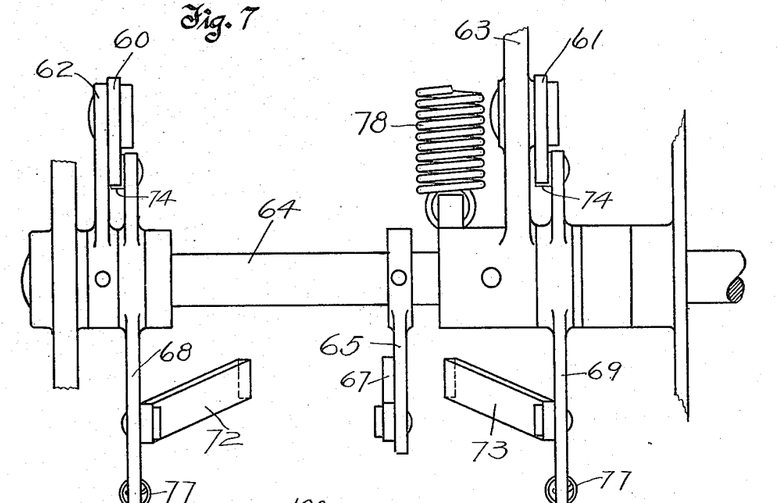
Fig. 7 is a detail showing the manner of actuating the several counters.
Figure 8:
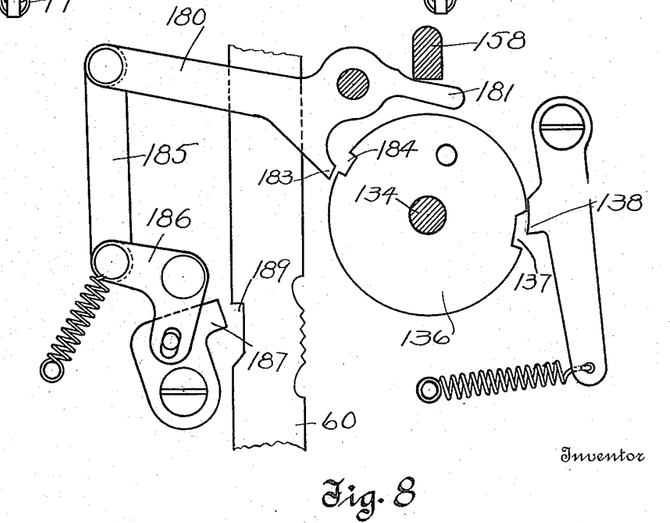
Fig. 8 is a detail of the lock mechanism.
Figure 9:
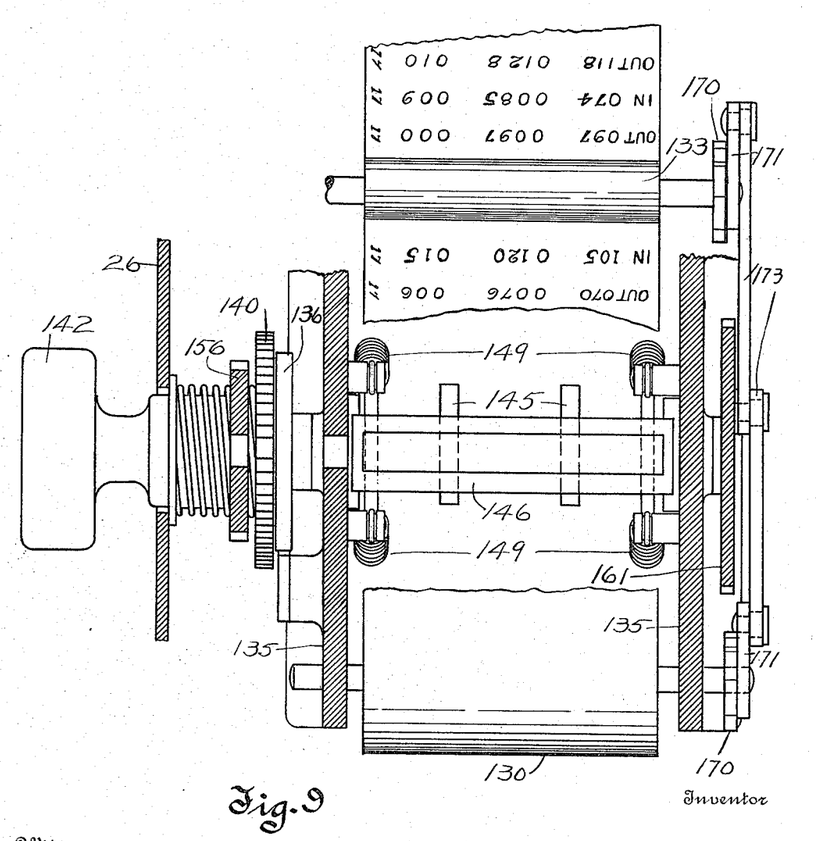
Fig. 9 is a plan of a portion of the printing mechanism.
Figure 10:
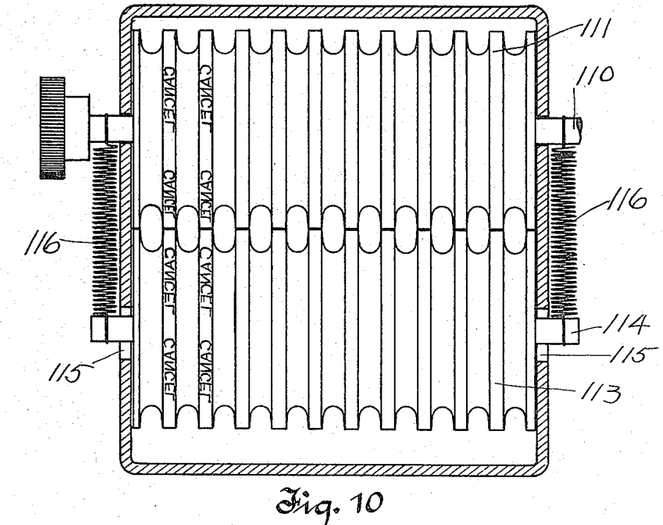
Fig. 10 is a plan of the canceling device.
Figure 11:
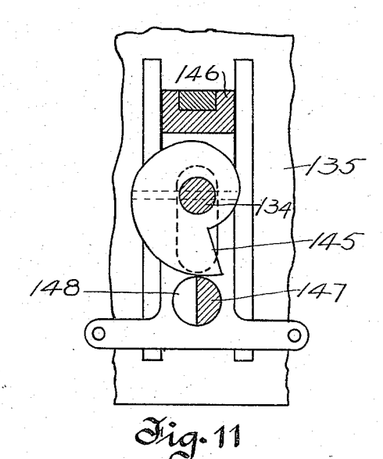
Fig. 11 is a sectional elevation of the printing platen and the cam which operates it.

The lever 63 is connected by a link 80 to a lever 81 which is loosely mounted on the shaft 31. (See Figs. 2, 5 and 6). A four toothed ratchet wheel 82 loosely mounted on the shaft 31 is moved one-fourth of a revolution at each operation of the machine by a pawl 83, carried by the lever 81. The inner end of a spiral spring 84 is attached to the shaft 31 while its outer end is attached by a coupling 85 to a drum 86 loosely mounted upon the shaft 31 between the spring and the ratchet wheel and secured to the latter. On the other side of the spring a drum 87 is rigidly secured to the shaft 31, and has four projecting lugs 88 equally spaced upon its periphery. These lugs are longitudinally staggered. A block 89 is mounted to slide freely upon a suitable support and is provided with a projection 90 adapted to be moved into the path of one of the lugs 88 and prevent rotation of the drum 87. A projection 91 at the other end of the block is adapted to be engaged by cams 92 on the drum 86. There are four of these cams, equally spaced about the periphery of the drum. Opposite cams are adapted to shift the block 89 in one direction while the intermediate cams are adapted to shift it in the other direction. Assuming the spring 84 is under suitable initial tension and that rotation of the drum 87 is prevented by one of the lugs 88 resting upon the projection 90, when one of the foot pedals is actuated and the shaft 64 rocked, the pawl 83 rotates the ratchet wheel 82 and drum 86 which is rigidly secured to the ratchet wheel, one-fourth of a revolution, thereby increasing the tension of the spring. Toward the latter part of the movement of the ratchet wheel one of the cams 92 moves the block 89 to a point where the lug 90 passes from in front of the lug 88 which it has until then engaged, thereby releasing the drum 87 and permitting it to rotate. The lug 90 in moving away from aforesaid lug 88 has, however, moved into the path of the next lug 88 which, engaging the lug 90, stops the drum 87 when it has moved one-fourth of a revolution. The turn stile 28 being rigidly secured to the shaft 31 will have also moved one-fourth of a revolution, dropping fares which have been deposited in the displayer on to the rollers of the canceling device.

The construction just described has two special advantages: the rapid movement of the turn stile after it is released practically removes the possibility, even during a rush, of a fare being passed to the canceling device without giving the conductor an opportunity to inspect it. The fact that after the turn stile begins to move it is beyond the power of the conductor to prevent it completing its movement, practically precludes the possibility of his tampering with the mechanism. The operation of the turnstile is in fact semi-automatic; i. e., energy is accumulated by pressing the pedal, then at the proper time the turnstile is unlocked and the accumulated energy operates the turnstile.

Figure 3:
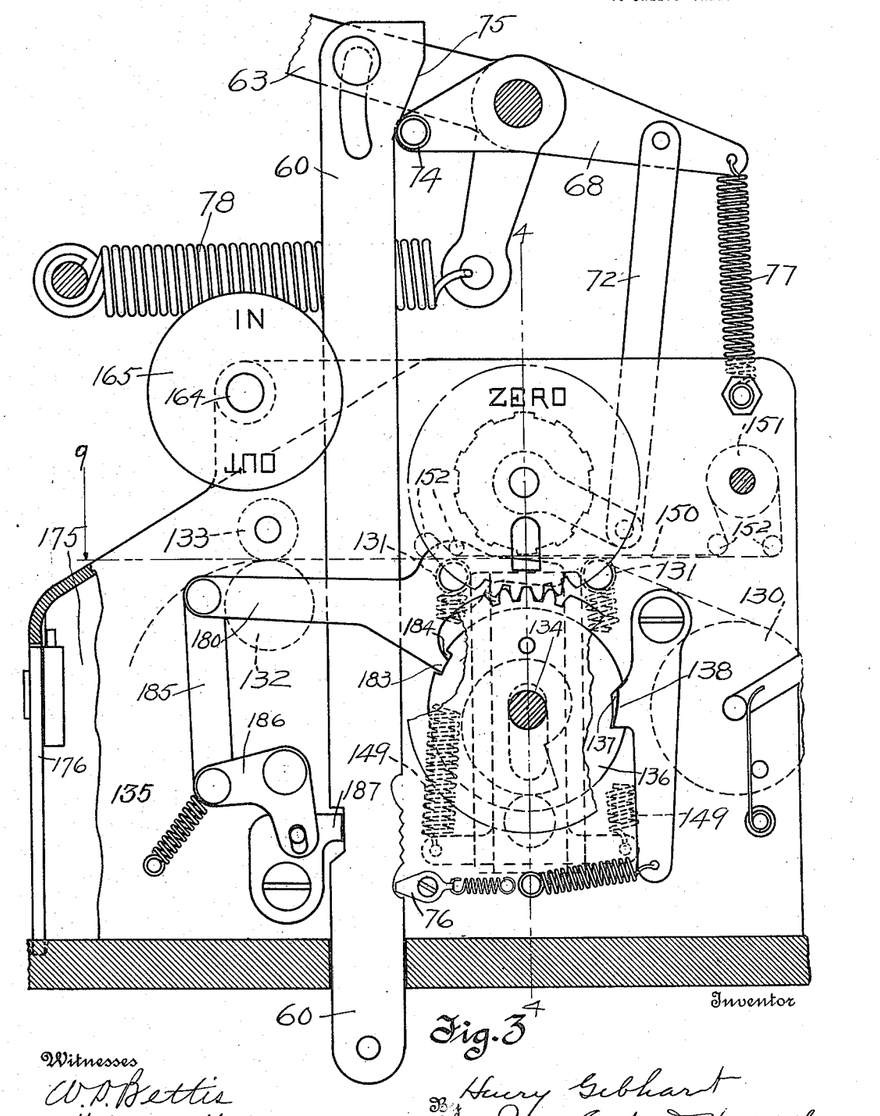
Fig. 3 is an elevation of the left hand side of the machine with the casing removed, the mechanism herein shown being supposed to occupy the blank space at the left of the till in Fig. 2.
Figure 4:
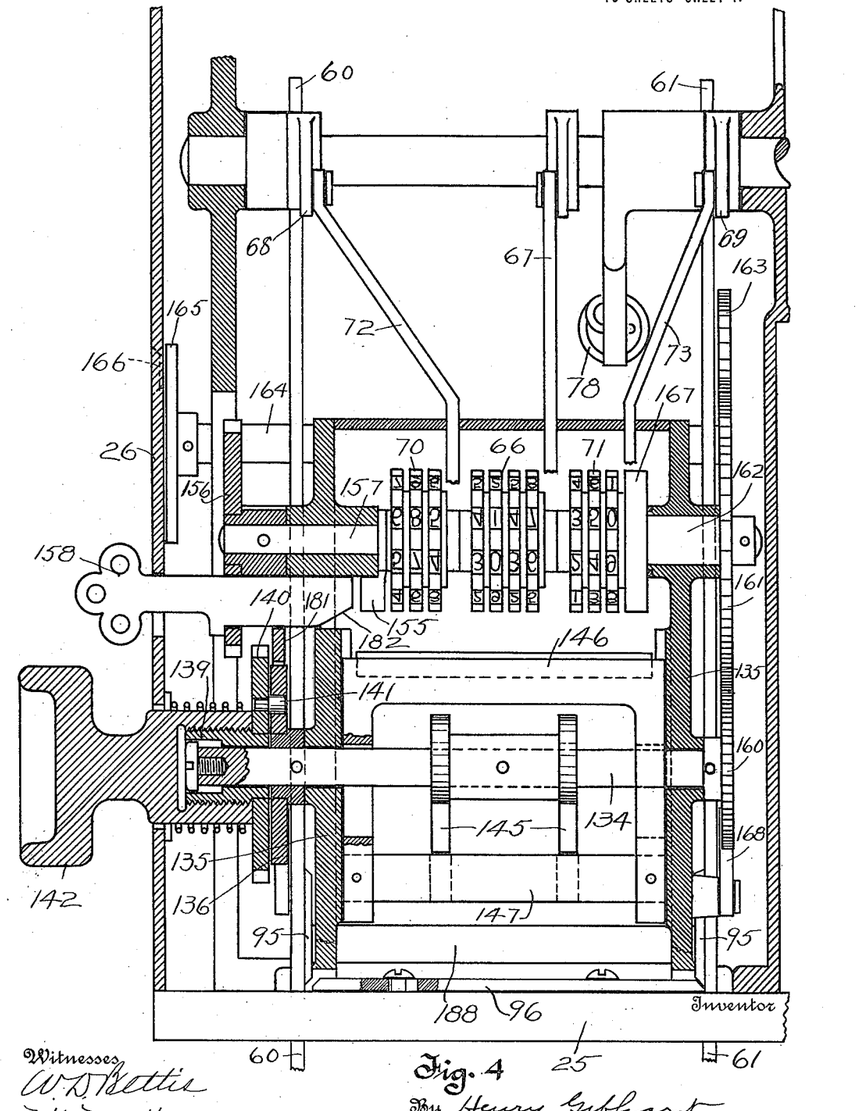
Fig. 4 is a front sectional elevation of the registering and printing mechanism, section being taken on the line 4—4 of Fig. 3, the wall shown in section at the extreme right being the left-hand wall of the till compartment of the Fig. 2.

Each of the pull rods, 60 and 61, is provided with a full stroke mechanism 76 (see Fig. 3). Each pull rod has also a projection 95 which, as the rod moves downward, engages a sliding lock 96 (see Fig. 4) and thrusts it into the path of the projection 95 carried by the other pull rod, the object being to prevent the rods 60 and 61 being operated simultaneously. The link 80 carries a pawl 97 which upon each operation of the machine engages the end of the bell hammer 98. This bell hammer is pivoted at 99 to a fixture 100 which also acts as a nut to secure the bell to the frame work of the machine. The position of the center 99 with reference to the end of the bell hammer, together with the action of the link 80 as controlled by its supporting members 63 and 81 causes a gradual recession of the pawl 97 toward the end of the bell hammer, which may be of such length that it will slip past the end of the pawl at approximately the end of the downward stroke of either pedal. Upon the return of the pedal the pawl 97 rocks upon its pivot and passes the end of the bell hammer, finally resuming the position shown in Fig. 5.

Figure 13:
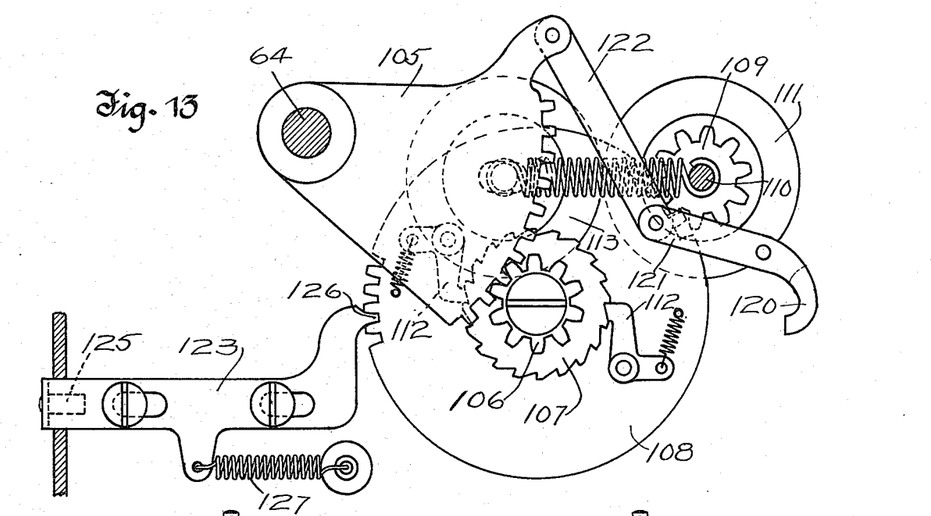
Fig. 13 illustrates the mechanism for operating the canceling device; also the device which locks the aforesaid mechanism when the till is removed from the fare compartment.
Figure 14:
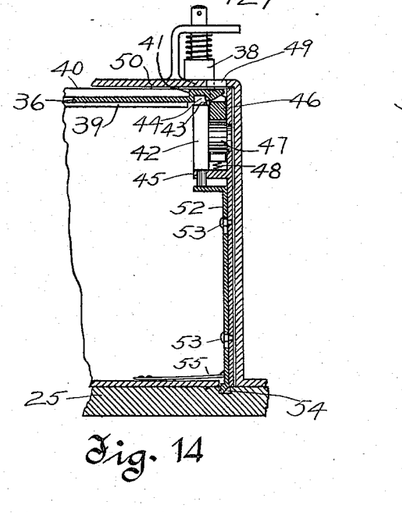
Figs. 14 and 15 are details of the till and Fig. 16 is a diagrammatic view of the mechanism for operating the trip indicator, printing ribbon and paper feed mechanism.
Figure 15:
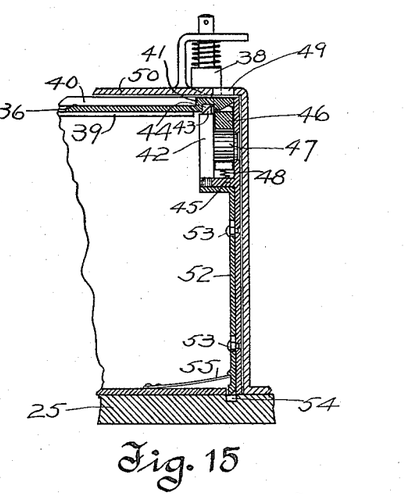
Figure 16:
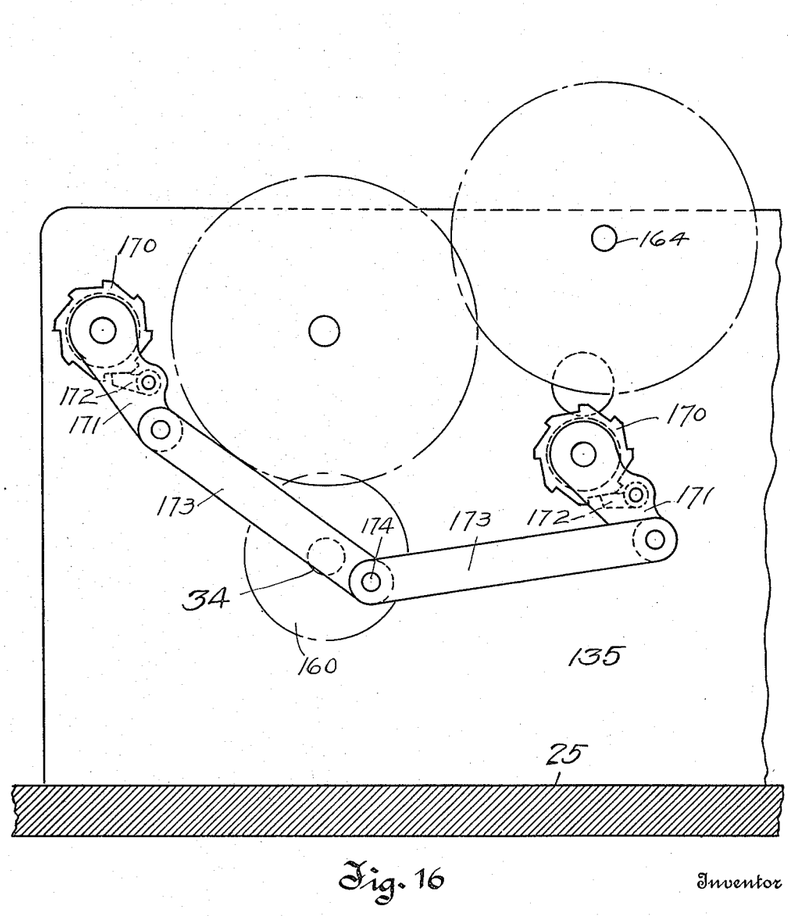

A toothed sector 105 is rigidly secured to the rock shaft 64 and meshes with a pinion 106 secured to a ratchet wheel 107 loosely mounted upon a stud carried by the frame of the machine. A gear 108 mounted upon the same stud is enmeshed with a pinion 109 rigidly secured to a shaft 110, upon which is rigidly mounted the roller 111 of the canceling device. A pair of pawls 112 is mounted on the gear 108 and engage the teeth of the ratchet wheel 107. Upon the downward stroke of either pedal the sector 105 rotates the pinion and ratchet wheel in a counter clockwise direction (see Fig. 13) the pawls 112 riding over the teeth of the ratchet wheel without moving the gear 108. Upon the return movement of the pedal the pinion and ratchet wheel are rotated in the opposite direction, which through the medium of the pawls 112 drives the gear 108 and through the several elements previously referred to drives the roller 111. The canceling roller 113 has a shaft 114 which is journaled in horizontal slots 115 and is drawn toward the roller 111 by springs 116. The ribbed construction of the rollers, which are preferably rubber, enables the rollers to handle fares of different sorts simultaneously, e. g.: if both coins and tickets have been deposited, the ribs between which a coin or coins are confined may be compressed without causing compression of the remainder of the ribs. This, together with the fact that each rib bears printing devices, which in the present instance are designed to print the word Canceled, practically insures that each ticket passing through the canceling device will be marked. The roller 113 is frictionally driven by the roller 111. Inking rollers 117 apply ink to the printing device as the rollers rotate.

From the foregoing description it is clear that all fares which are in the displayer at the time a pedal is pressed will be dropped into the canceling device upon the downward stroke of the pedal and passed through the canceling device upon the return stroke. In other words, each operation of the pedal transfers all fares from the displayer to the till.

A shield 120 pivotally mounted on the frame of the machine normally covers the entrance to the guides 39 and 40 of the till and prevents the cover being put on the till. An arm 121 attached to said shield is connected by a link 122 to the sector 105. At each downward stroke of a pedal the shield 120 is thereby rocked to the position it occupies in Fig. 1. Therefore, when the till is to be removed the first thing necessary is to actuate one of the pedals, after which the lid may be placed on the till and the till withdrawn from the fare compartment in the manner already described. A sliding pawl 123 mounted upon the outside of the fare compartment, has a horizontally extending lug 124 carrying a plunger 125 which passes through an aperture in the rear wall of the fare compartment, and is pushed outward when the till is placed in the compartment. The other end of the pawl 123 carries a projection 126 adapted to engage between two teeth of the gear 108. When the till is withdrawn a spring 127 draws the pawl into the position shown in Fig. 13 and locks the gear 108. While the gear 108 is locked the pedal cannot return upward; therefore, should there be any fares in the displayer at the time the lid is put on the till it will be impossible for them to pass through the displayer and drop into the fare compartment after the till has been removed. This is to prevent the operation of the machine without the till being in the compartment. The till cover is made long enough so that after it is on the till the shield 120 will strike the lid immediately the pedal starts upward and prevent further movement of the pedal or the other portions of the mechanism. This provision prevents the machine being operated with a lid on the till and precludes the possibility of allowing fares to accumulate on the top of the lid, which, after the till is removed might be secured by the person removing the till.

The figures on the counters 66, 70 and 71 are raised so they may be used for printing a record. A roll of paper 130 is mounted on a shaft journaled in notches cut in plates 135 and the end of the paper, passes over guide pins 131 and between rollers 132 and 133. A shaft 134 is journaled in the plates 135. A disk 136 is rigidly secured to said shaft, and has a notch 137 in which a pawl 138 normally lies. A sleeve 139 loosely mounted on the shaft carries a gear 140, which in turn carries a pin 141 normally reposing in an aperture formed in the disk 136, thereby coupling the gear and disk together. A knob 142 having an internal screw thread is screwed on to the threaded exterior of the sleeve 139. A compression spring on the outside of the shank of the knob 142, confined between the gear 140 and casing 26, tends to keep the gear 140 against the disk 136. A pair of cams 145 is rigidly secured to the shaft 134. A platen 146 mounted to slide vertically in suitable guides formed on the plates 135 has a rigidly secured rod 147, having recesses 148 coincident with the cams 145. Springs 149 tend to lift the platen, which tendency is restrained by the cams. At the end of each trip, or at such intervals as directed, the conductor turns the knob 142 and almost immediately the apex of the cams pass beyond the edges of the recesses 148 thereby releasing the platen and permitting it to strike the paper and cause an impression to be printed thereon by the type on the counter wheels. An endless ink ribbon 150 passing around a drum 151 and guides 152 is interposed between the counter wheels and the paper. The pawl 138 normally keeps the disk 136 in position shown in Fig. 3 and when the shaft is rotated the pawl dropping into the notch 137 acts as a signal to show that a knob has been turned far enough. A stationary type 155 bears numbers or other symbols identifying the particular fare box in which the printing record is made. After printing the record, if it is desired to set one or more of the counters to zero, the knob 142 is pulled outward to disengage the pin 141 from the disk 136. In doing so the gear 140 is brought into enmeshment with a gear 156 carried by the counter shaft 157. Before the gear 156 can be rotated, however, a key 158 which, inserted through an aperture in the casing 26 passes through an aperture in the gear 156 and into a guide aperture in the plate 135, must be withdrawn. The knob 142 may then be rotated one or more times as desired.

A gear 160 rigidly secured to the shaft 134 meshes with a gear 161 rigidly secured to a sleeve 162 loosely mounted on the counter shaft 157. The gear 161 in turn meshes with the gear 163 rigidly secured to a shaft 164, on the other end of which is rigidly secured a trip indicator 165 bearing the words "In" and "Out" or words of similar import. When the pawl 138 is in the notch 137 one of the words is visible through a sight opening 166 in the casing 26. A printing wheel 167 rigidly secured to the one end of the sleeve 162 has upon its periphery the words "In" and "Out" in such position that when one of said words is visible through the sight opening the corresponding word is in position to be printed on the record slip. The gear 160 having half the number of teeth of the gears 161 and 163 it is clear that for each complete revolution of the knob 142, in other words each time a record is printed the trip indicator is reversed. Therefore, the records will be alternately marked "In" and "Out", etc. A pawl 168 mounted on the plate 135 (see Fig. 4) engages the teeth of gear 161 and prevents retrograde movement of the knob 142.

The paper feed roll 132 and the ribbon drum 151 are rigidly secured to their respective shafts. Upon each of said shafts a ratchet wheel 170 is rigidly secured, and a lever 171 is loosely mounted on each shaft, carrying a pawl 172 adapted to engage the teeth of the adjacent ratchet wheel. The levers 171 are connected by links 173 to a pin 174 located off center on the gear 160. The pin 174 is located in such position that the initial movement of the knob 142 imparts but slight movement to the links 173; moreover, the total throw of the levers 170 being greater than the distance between adjacent teeth of the ratchet wheel the pawls 172 are not in position to act upon the ratchet wheels immediately. Therefore, neither the paper feed roll nor ribbon drum move until after the printing impression is made. The printed record after passing between the rolls 132 and 133 accumulates loosely in a recess 175, which is closed by a locked lid 176.

A lever 180 pivotally supported on the plate 135 has an extension 181 which is engaged and depressed by the oblique end 182 of the key 158 when it is inserted. When the key is withdrawn an extension 183 on the lever 180 engages a notch 184 in the disk 136 and locks said disk against rotation. The free end of the lever 180 is connected by a link 185 to one lever of bell crank 186. The other lever of said bell crank is attached by a slot and pin connection to a pawl 187 rigidly secured to a rock shaft 188 (see Fig. 4), said shaft having a similar pawl, 187, at its other end. (Second pawl 187 not shown in drawings). Each of the pawls 187 is adapted, when the key 158 is withdrawn, to engage in a notch 189 in one of the pull rods. Therefore, when the key is withdrawn the pull rods are also locked.

With the conductor under orders to register each passenger who boards the car, a spotter can readily check up the work of the conductor: stationing himself where he can observe the number of persons who board the car he can count the bell strokes and tell whether or not each one has been registered. If he cannot find a position where he can see the passengers as they board the car, he may, by counting the passengers aboard when he gets on and adding the number to the number of registrations made after he gets on, see if the total agrees with the number of passengers on the car when he gets off plus those who have left the car while he was aboard. Other ways may be devised for utilizing the bell as a checking means. The conductor will be expected to have a fare in the box to represent every passenger registered.

Having all cash and tickets (the latter canceled) in the till, and the till so constructed that it is impossible for the person who removes it to gain access to its contents, is a great step in the desired direction. All this is supplemented, however, by the printed record, which, locked in a separate recess, is inaccessible to and therefore a check upon the person authorized to remove the contents of the till.

It is to be understood that the conductor is held responsible for the character of fares he permits passengers to ride on, as the displayer enables him to inspect coins and tickets before they are transferred to the till. But during "rush" periods, when fares are being deposited in rapid succession, often two or more at once, it is as much as he can do to give the fares the required inspection and press the pedal for each passenger. Therefore, actuating the registering and transferring mechanism simultaneously and by one action on the part of the conductor is practically essential. Were he required to register and transfer fares by separate actions he would almost inevitably be compelled to neglect one or the other at times; he could not then be held responsible for mistakes in registration or for worthless coins or tickets found in the till. If the conductor registers the passengers as they pass into the car there will never be more than a few, and usually but one, fare in the displayer. The great rapidity with which the turn stile moves practically precludes the possibility of a belated fare passing through with those the conductor has inspected.

I do not wish to be understood as limiting my invention to the specific construction shown as various departures may be made therefrom while remaining within the scope of my claims.

What I claim is as follows:

1. A fare box having a fare compartment, a removable till therein, a fare displayer to receive and afford inspection of fares before they are deposited in the till, a lid for but normally not on the till, means for placing the lid on the till while it is in the compartment, means for transferring fares from the displayer to the till, and means which disables the last mentioned means and prevents its operation while the till is in the compartment with the lid on.

2. In a fare box, the combination of a series of fare-receiving plates rotatable upon a common axis, a spring motor adapted to intermittently rotate said plates, means for storing energy in said spring motor for such operation, means for holding the plates stationary while energy is being stored in the motor, and means for releasing said plates when as much new energy is stored in the motor as was expended in the last preceding rotation of the plates.

3. In a fare box, a series of rotating fare-receiving plates revolving upon a common axis, a series of stops arranged to control the positions of said plates, a spring one end of which is operatively connected with said series of plates, said spring imparting intermittent movement to the plates, means for winding the spring preparatory to actuating the plates, and means actuated by said winding means and engaging said stops to release the plates after the spring is wound.

4. In a fare box, a series of fare-receiving plates mounted upon a common axis of rotation, a spring motor adapted to intermittently actuate said plates, means for winding said spring to store the motive force therein, and means actuated by the spring-winding means for holding the plates stationary while the spring is being wound, and for releasing said plates when the winding of said spring is completed.

5. In a fare box, a series of rotary fare-receiving plates mounted upon a common axis, stops arranged at different points to arrest the movement of said plates, a spring motor adapted to actuate said plates, means for winding said spring to store energy therein, a series of cams actuated by said spring-winding means, and a reciprocating member actuated by said cams and engaging said stops after each intermittent movement of said plates.

In testimony whereof I affix my signature in the presence of two subscribing witnesses.

HENRY GEBHART.

Witnesses:
WILLIAM K. MARSHALL,
F. K. FASSETT.

Copies of this patent may be obtained for five cents each, by addressing the "Commissioner of Patents, Washington, D. C."